United States Patent
Kim

(10) Patent No.: US 6,467,784 B1
(45) Date of Patent: Oct. 22, 2002

(54) ANTI-ROLL SYSTEM FOR VEHICLE

(75) Inventor: Keun-Bae Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/657,199

(22) Filed: Sep. 7, 2000

(30) Foreign Application Priority Data

Dec. 23, 1999 (KR) .............................. 99-61021

(51) Int. Cl.[7] .............................................. B60G 21/06
(52) U.S. Cl. ........................... 280/124.106; 280/93.51; 280/124.107
(58) Field of Search .................. 280/124.106, 124.107, 280/124.149, 124.152, 124.137, 93.502, 93.507, 93.508, 93.51; 267/183, 188

(56) References Cited

U.S. PATENT DOCUMENTS

| | | | | |
|---|---|---|---|---|
| 980,508 A | * | 1/1911 | Gardner | 280/124.106 |
| 2,032,657 A | * | 3/1936 | Frederickson | 280/124.111 |
| 2,852,269 A | * | 9/1958 | Gaines | 280/124.107 |
| 2,998,263 A | * | 8/1961 | Muller et al. | 280/124.106 |
| 3,397,895 A | * | 8/1968 | Kuniskis | 280/124.107 |
| 4,218,072 A | * | 8/1980 | Wallis | 280/124.107 |
| 4,964,480 A | * | 10/1990 | Kopczynski | 180/22 |
| 5,197,561 A | * | 3/1993 | Holka | 280/93.51 |
| 5,382,034 A | * | 1/1995 | Parker et al. | 280/104 |
| 5,505,479 A | * | 4/1996 | Lee | 280/124.107 |
| 5,732,969 A | * | 3/1998 | Spoto | 280/124.107 |

* cited by examiner

Primary Examiner—Paul N. Dickson
Assistant Examiner—David R. Dunn
(74) Attorney, Agent, or Firm—Christie, Parker & Hale, LLP

(57) ABSTRACT

An anti-roll system for vehicles includes first and second hinge shafts mounted in connectors, which connect left and right lower control arms to a vehicle body. The first and second hinge shafts rotates as the left and right lower control arms respectively undergo movement, and when one of the hinge shafts is rotated in one direction, and the other is rotated in the opposite direction.

9 Claims, 5 Drawing Sheets

ANTI-ROLL SYSTEM FOR VEHICLE

BACKGROUND OF THE INVENTION (a) Field of the Invention

The present invention relates to an anti-roll system for vehicles that enables the easy design of a suspension system and that limits the amount of noise generated.

(b) Description of the Related Art

Vehicles undergo some degree of rolling during cornering and other turning maneuvers, and as a result of an uneven road surface. Accordingly, an apparatus is provided for minimizing rolling.

FIG. 5 shows a perspective view of a conventional stabilizer. Reference numeral 100 indicates the stabilizer. The stabilizer 100 is applied to an independent suspension system such as a wishbone or Macpherson-type suspension system. The stabilizer 100 acts as a torsion bar spring that maintains equilibrium of the vehicle during rolling movements of the same.

With reference to FIG. 6, a middle portion of the stabilizer 100 is pivotally fixed to a vehicle body, and each connector 104 at ends of bent portions 102 provided on opposing ends of the stabilizer 100 is connected to a lower control arm 108 of a suspension system or to a middle portion of a strut assembly 110 with a connecting link 106 interposed therebetween. With this configuration, when left and right wheels undergo simultaneous ascending and descending motions, the stabilizer 100 performs no function. However, when only one of the wheels either ascends or descends, the stabilizer 100 undergoes a twisting movement and a resulting elasticity of torsion acts to reduce rolling of the vehicle.

Although the conventional stabilizer as described above is an effective apparatus in minimizing rolling, a substantial amount of space is utilized by the stabilizer to perform its operation. As a result, difficulties arise in the designing of the suspension system. Also, during the operation of the stabilizer, a great amount of noise is generated by a rubber bushing used in mounting the stabilizer to the vehicle body or lower control arm.

SUMMARY OF THE INVENTION

The present invention has been made in an effort to solve the above problems.

It is an object of the present invention to provide an anti-roll system for vehicles that enables the easy design of a suspension system and that limits the amount of noise generated.

To achieve the above object, the present invention provides an anti-roll system for vehicles comprising first and second hinge shafts mounted in connectors, which connect left and right lower control arms to a vehicle body, the first and second hinge shafts rotating as the left and right lower control arms respectively undergo movement, and when one of the hinge shafts is rotated in one direction, the other is rotated in the opposite direction.

According to a feature of the present invention, first and second drive gears are mounted on a central portion of first and second hinge shafts, respectively; a second rotating axis is provided at a predetermined distance from the second hinge shaft and substantially parallel to the same; a second driven gear meshed with the second drive gear is formed at one end of the second rotating axis; a first rotating axis is provided at a predetermined distance from the first hinge shaft and substantially parallel to the same; a first driven gear is formed at one end of the first rotating axis; an idling gear is interposed between and meshed with the first drive gear and the first driven gear; first and second pinion gears are provided at the other ends of the first and second rotating axes, respectively; the first and second pinion gears are meshed with first and second racks, respectively, the first and second racks being interconnected via a cable; and a tension of the cable is adjusted by cable tension control means.

According to another feature of the present invention, a screw rod of a predetermined length is integrally formed to an end of the cable adjacent to the second rack with a stopper interposed therebetween, the screw rod being inserted in the second rack; a first washer is provided flush to one end of the second rack and a first nut is screwed onto the screw rod until tightly contacting the first washer; and a second washer is provided to the other end of the second rack and a second nut is screwed onto the screw rod until tightly contacting the second washer, thereby enabling the tension of the cable to be controlled by adjusting the nuts.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
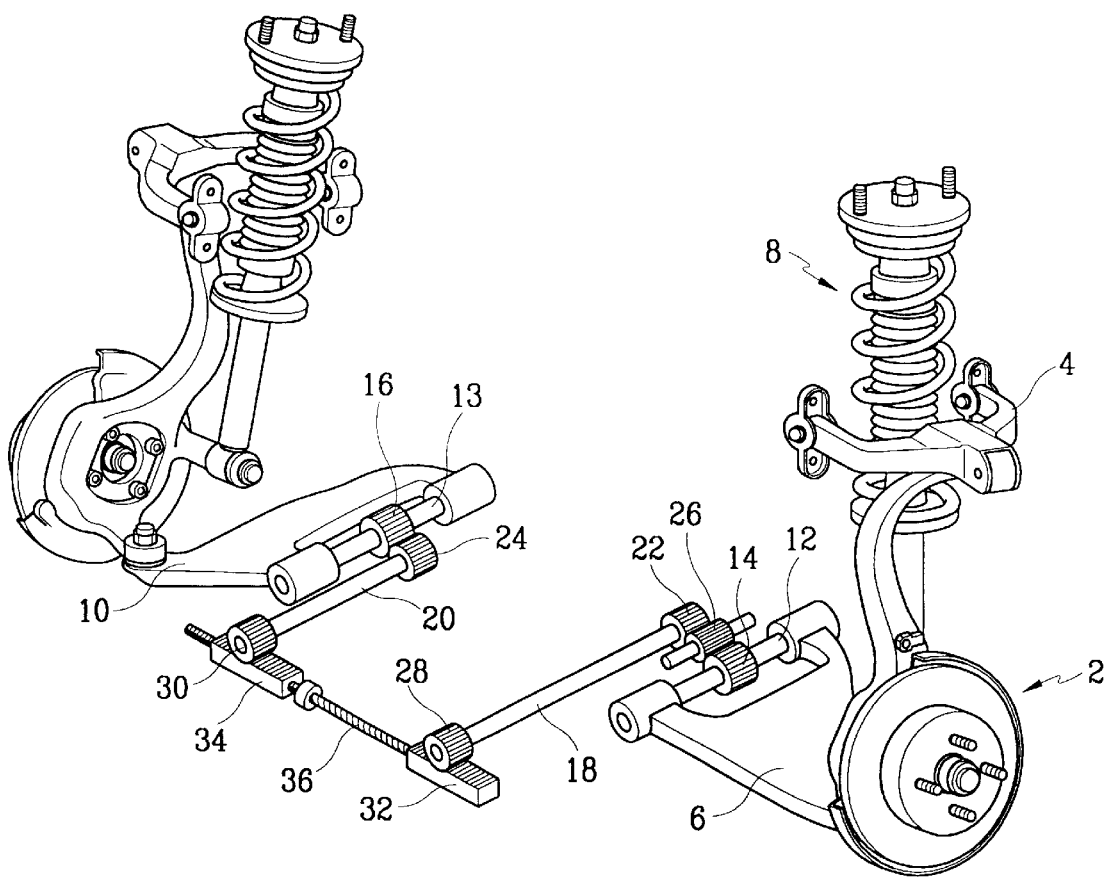
FIG. 1 is a perspective view of a suspension system to which an anti-roll system according to a preferred embodiment of the present invention is applied.

FIG. 1 shows a perspective view of a suspension system to which an anti-roll system according to a preferred embodiment of the present invention is applied.

Each wheel (not shown) is rotatably supported by a wheel carrier 2, and the wheel carriers 2 are connected to a vehicle body with an upper control arm 4 and left and right lower control arms 6 and 10 interposed therebetween, thereby enabling the wheel carriers 2 to undergo ascending and descending motions. The wheel carriers 2 are also connected to the vehicle body through a strut assembly 8, the strut assembly 8 offsetting up and down vibrations received from the wheels travelling on an uneven road surface. With regard to forces applied in a transverse direction of the vehicle, these are absorbed by an elasticity of rubber bushings provided at ends of the upper control arm 4 and the left and right lower control arms 6 and 10.

Figure 2:
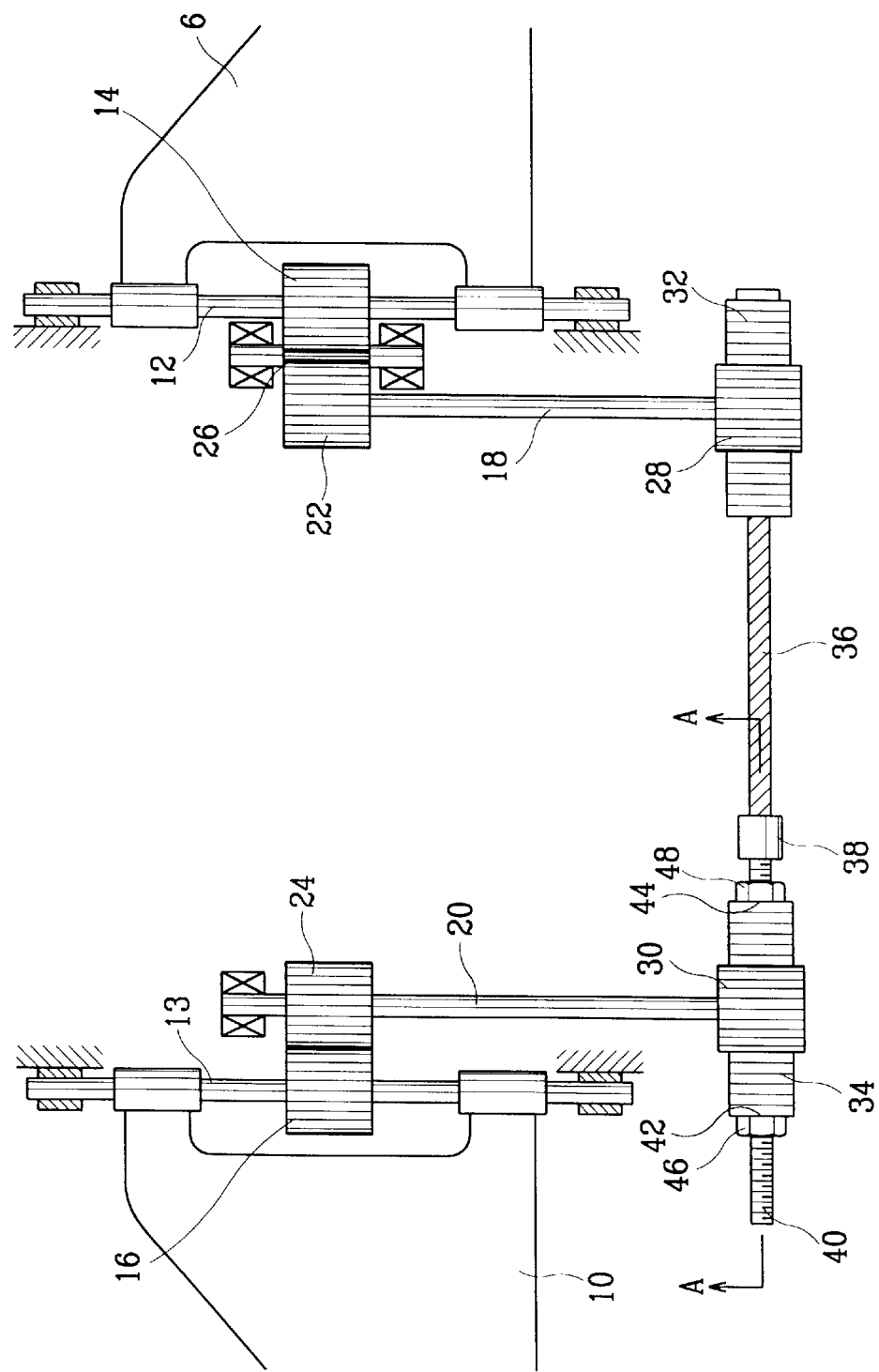
FIG. 2 is a top plan view of the anti-roll system shown in FIG. 1.

With reference also to FIG. 2. an anti-roll system according to a preferred embodiment of the present invention is applied to the suspension system. First and second drive gears 14 and 16 are mounted on a central portion of the first and second hinge shafts 12 and 13, respectively, the first and second hinge shafts 12 and 13 being fixedly inserted in interior connectors of the left and right lower control arms 6 and 10, respectively. Provided at a predetermined distance from the second hinge shaft 13 and substantially parallel to the same is a second rotating axle 20, and a second driven gear 24 meshed with the second drive gear 16 is formed at one end of the second rotating axle 20. Further, provided at a predetermined distance from the first hinge shaft 12 and substantially parallel to the same is a first rotating axle 18, and a first driven gear 22 is formed at one end of the first rotating axle 18. An idling gear 26 is interposed between and meshed with the first drive gear 14 and the first driven gear 22.

Provided at the other ends of the first and second rotating axles 18 and 20 are first and second pinion gears 28 and 30, respectively. The first and second pinion gears 28 and 30 are meshed with first and second racks 32 and 34, respectively, the first and second racks 32 and 34 being interconnected via a cable 36. A tension of the cable 36 is adjusted by cable tension control means.

Figure 3:
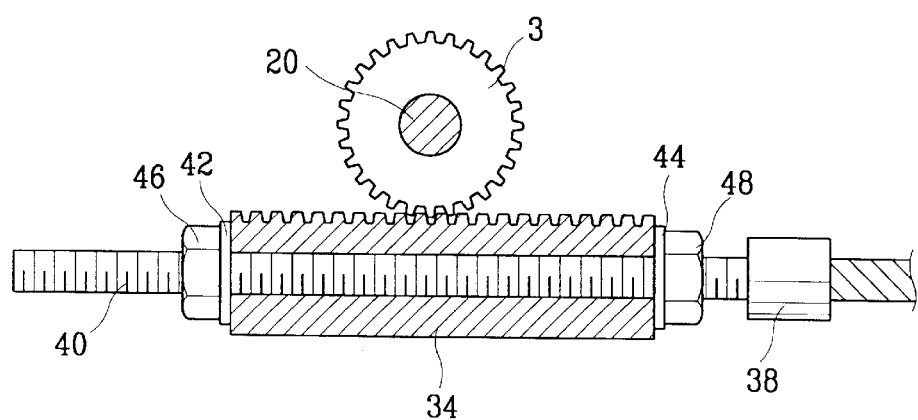
FIG. 3 is a sectional view taken along line A—A of FIG. 2.
Figure 4:
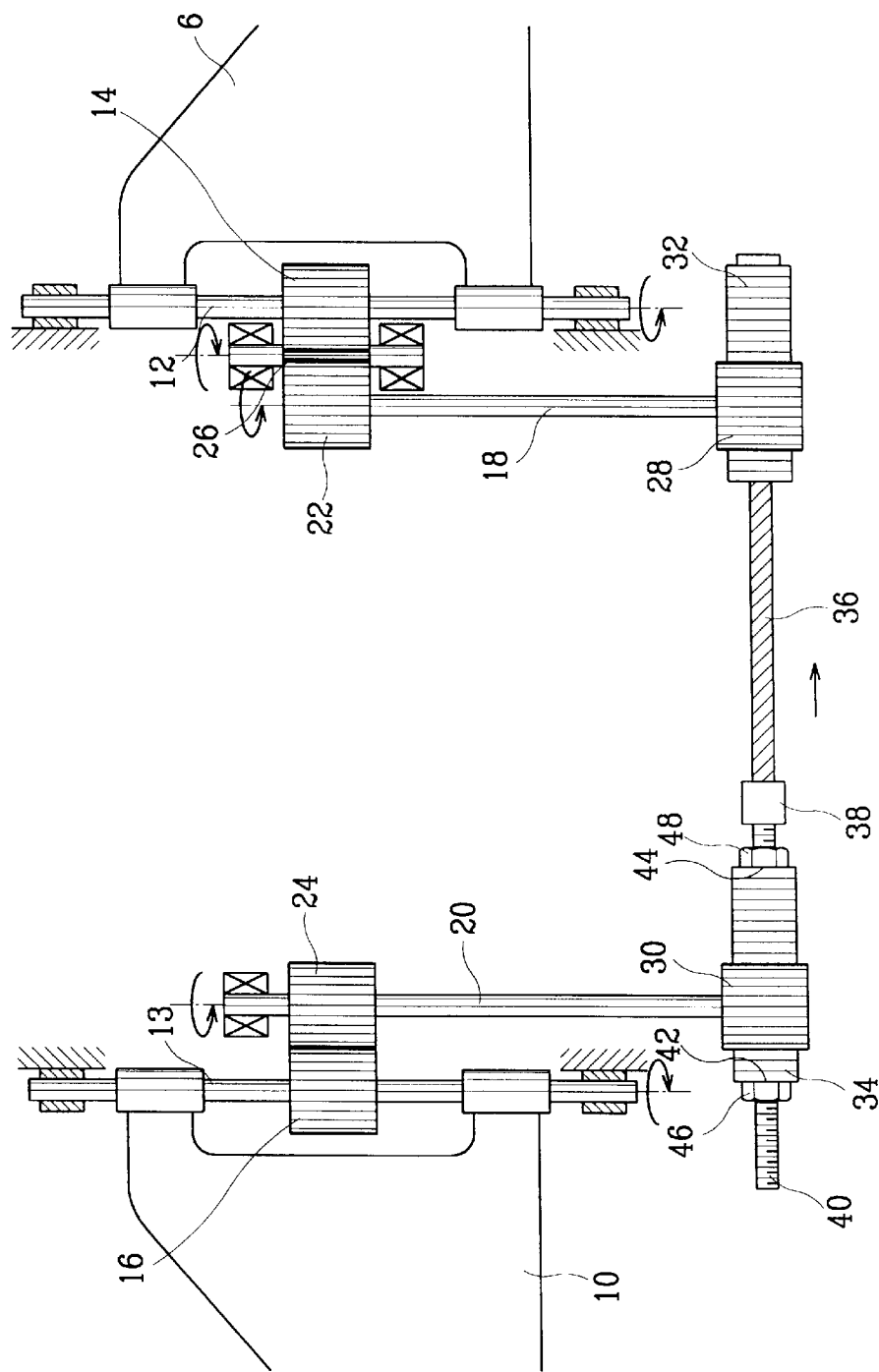
FIG. 4 is a top plan view of the anti-roll system shown in FIG. 1 in an operating state.
Figure 5:
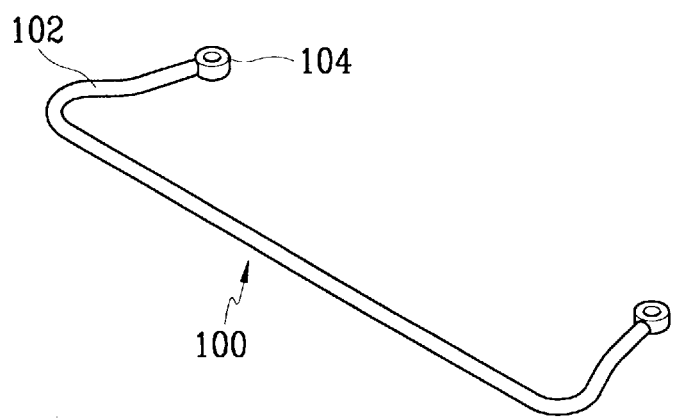
FIG. 5 is a perspective view of a conventional stabilizer.
Figure 6:
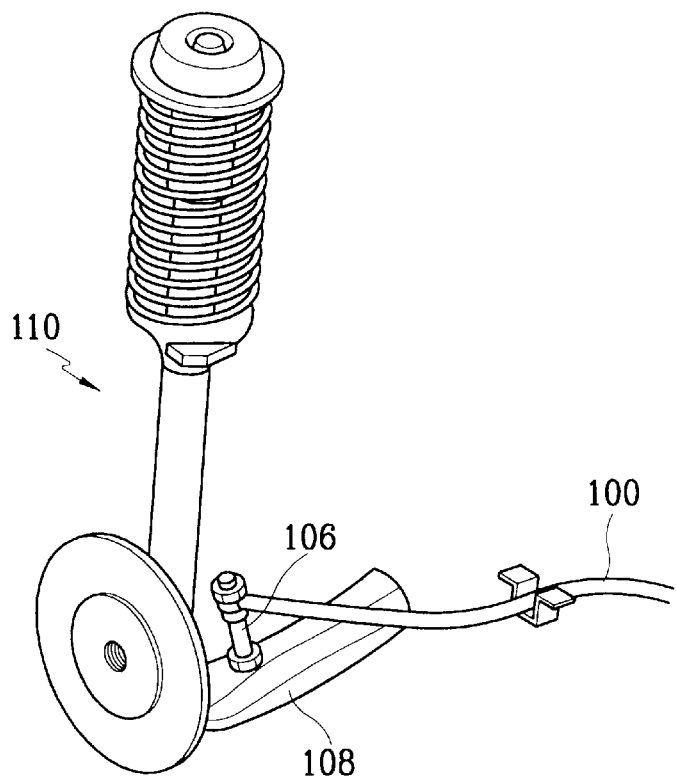
FIG. 6 is a partial view of the stabilizer of FIG. 5 in a state connected to a suspension system.

In more detail, as shown in FIG. 3, a screw rod 40 of a predetermined length is integrally formed to an end of the cable 36 adjacent to the second rack 34 with a stopper 38 interposed therebetween. The screw rod 40 is inserted in the second rack 34. A first washer 42 is provided flush to one end of the second rack 34 and a first nut 46 is screwed onto the screw rod 40 until tightly contacting the first washer 42, and a second washer 44 is provided to the other end of the second rack 34 and a second nut 48 is screwed onto the screw rod 40 until tightly contacting the second washer 44. Accordingly, the tension of the cable 36 can be controlled by adjusting the nuts 46 and 48.

As described above, the first and second hinge shafts 12 and 13 are connected to the left and right lower control arms 6 and 10, respectively. Accordingly, the first and second hinge shafts 12 and 13 are rotatably connected to the vehicle body. It is preferable that the hinge shafts 12 and 13 are connected to the vehicle body through rubber bushings as in the prior art. Also, the first and second rotating axles 18 and 20 are connected to the vehicle body with rolling members (not shown) interposed therebetween, and have a support structure to enable a left/right sliding motion.

In the anti-roll system of the present invention as described above, if by a turning operation or an uneven road surface the left lower control arm 6 is moved upward, the first drive gear 14 of the first hinge shaft 12 rotates in a counterclockwise direction (in the drawing) such that the idling gear 26 is rotated clockwise and the first driven gear 22 is rotated in a counterclockwise direction. This rotational force is transmitted to the first pinion gear 28 through the first rotating axis 18 such that the first rack 32 is moved to the right (in the drawing).

If the first rack 32 is moved to the right as described above, the cable 36 is pulled to the right such that the second rack 34 is also pulled to the right, resulting in the second pinion gear 30 being rotated counterclockwise (in the drawing). By the counterclockwise rotation of the second pinion gear 30, the second driven gear 24 is rotated counterclockwise and the second drive gear 16 is rotated clockwise. This results in the second hinge shaft 13 being rotated together with the second drive gear 16, that is, in the clockwise direction, thereby forcing the right lower control arm 10 in the upward direction. Accordingly, rolling is limited.

The anti-roll system of the present invention can also operate in reverse to that described above. That is, if the right lower control arm 10 is moved upward by a turning operation or an uneven road surface, the elements of the anti-roll system operate in opposite directions as described above such that the left lower control 6 is forced upward.

In the anti-roll system of the present invention as described above, when one of the two lower control arms is bounds or rebounds, a force is applied to the other lower control arm in the same direction, thereby minimizing rolling. Also, by using a system that utilizes substantially less space in operation than the conventional stabilizer, the suspension system can be designed more freely. Finally, because rubber bushings for fixing the conventional stabilizer are not need, the generation of noise by the rubber bushings is avoided.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An anti-roll system for a vehicle comprising first and second hinge shafts coupled to left and right lower control arms of a vehicle body, the first and second hinge shafts rotating as the left and right lower control arms respectively undergo movement, and when one of the hinge shafts is rotated in a first direction, the other is rotated in a second direction opposite the first direction, wherein first and second drive gears are mounted on a central portion of first and second hinge shafts, respectively; a second rotating axle is provided at a predetermined distance from the second hinge shaft and substantially parallel to the same; a second driven gear meshed with the second drive gear is formed at one end of the second rotating axle; a first rotating axle is provided at a predetermined distance from the first hinge shaft and substantially parallel to the same; a first driven gear is formed at one end of the first rotating axle; an idling gear is interposed between and meshed with the first drive gear and the first driven gear; first and second pinion gears are provided at the other ends of the first and second rotating axes, respectively; the first and second pinion gears are meshed with first and second racks, respectively, the first and second racks being interconnected via a cable; and a tension of the cable is adjusted by cable tension control means.

2. The anti-roll system of claim 1 wherein a screw rod of a predetermined length is integrally formed to an end of the cable adjacent to the second rack with a stopper interposed therebetween, the screw rod being inserted in the second rack; a first washer is provided flush to one end of the second rack and a first nut is screwed onto the screw rod until tightly contacting the first washer; and a second washer is provided to the other end of the second rack and a second nut is screwed onto the screw rod until tightly contacting the second washer, thereby enabling the tension of the cable to be controlled by adjusting the nuts.

3. An anti-roll system for a vehicle comprising a first and second control arms, the system comprising:
   a first drive gear coupled to the first control arm where movement of the first control arm causes rotation of the first drive gear and wherein rotation of the first drive gear causes movement of the first control arm;
   a second drive gear coupled to the second control arm, wherein the movement of the second control arm causes rotation of the second drive gear and wherein rotation of the second drive gear causes movement of the second control arm; and a plurality of gears coupling the first drive gear to the second drive gear, wherein rotation of one of said first and second drive gears in a first direction causes rotation of the other of said first and second drive gears in a second direction opposite the first direction, wherein said plurality of gears comprise, an idling gear meshed with the first drive gear, a first driven gear meshed with the idling gear, and a second driven gear meshed with the second drive gear, wherein the second driven gear is coupled to the first driven gear, wherein rotation of the first driven gear in one direction causes rotation of the second driven gear in the same direction.

4. The anti-roll system of claim 3 further comprising:

a first pinion gear coaxially coupled to the first driven gear;

a second pinion gear coaxially coupled the second driven gear; and a first rack coupled to the first pinion gear; and a second rack coupled to the second pinion gear and coupled to the first rack.

5. The anti-roll system of claim 4 wherein a first axle couples the first pinion gear to the first driven gear and wherein a second axle couples the second pinion gear to the second driven gear.

6. The anti-roll system of claim 4 further comprising a cable coupling the first rack to the second rack.

7. The anti-roll system of claim 6 further comprising a screw rod coupled to the cable and to the second rack.

8. The anti-roll system of claim 7 further comprising:

a first nut threaded on the screw rod on a first end of the second rack; and a second nut threaded on the screw rod on a second end of the second rack opposite the first end.

9. The anti-roll system of claim 7 wherein the tension of the cable is adjustable.

* * * * *